United States Patent
Martin (10) Patent No.: US 9,967,024 B1
(45) Date of Patent: May 8, 2018

(54) AUTOMATIC OPTICAL REFLECTOMETER POWER ADJUSTMENT

(71) Applicant: MACOM Technology Solutions Holdings, Inc., Lowell, MA (US)

(72) Inventor: Arlen R. Martin, Blandon, PA (US)

(73) Assignee: MACOM TECHNOLOGY SOLUTIONS HOLDINGS, INC., Lowell, MA (US)

( * ) Notice: Subject to any disclaimer, the term of this patent is extended or adjusted under 35 U.S.C. 154(b) by 0 days. days.

(21) Appl. No.: 15/484,741

(22) Filed: Apr. 11, 2017

(51) Int. Cl.
*H04B 10/071* (2013.01)
*H04B 10/079* (2013.01)
*H04B 10/25* (2013.01)
*H04B 10/50* (2013.01)

(52) U.S. Cl.
CPC ..... *H04B 10/071* (2013.01); *H04B 10/07955* (2013.01); *H04B 10/2504* (2013.01); *H04B 10/50* (2013.01)

(58) Field of Classification Search
CPC ............ H04B 10/071; H04B 10/07955; H04B 10/2504; H04B 10/50
USPC .......................................................... 398/16
See application file for complete search history.

(56) References Cited

U.S. PATENT DOCUMENTS

| | | | |
|---|---|---|---|
| 2013/0088718 A1* | 4/2013 | Perron | G01M 11/3127 356/445 |
| 2013/0148108 A1* | 6/2013 | Li | H04B 10/071 356/73.1 |
| 2016/0197672 A1* | 7/2016 | Scholten | G01M 11/3109 398/10 |
| 2016/0233956 A1* | 8/2016 | Kang | H04B 10/071 |
| 2017/0307473 A1* | 10/2017 | Chen | G01M 11/3127 |

* cited by examiner

*Primary Examiner* — Dalzid Singh
(74) *Attorney, Agent, or Firm* — Thomas Horstemeyer, LLP; Michael J. D'Aurelio; Jason M. Perilla (57) ABSTRACT

The automatic adjustment of output power of a transmitter is described. In one embodiment, an optical transmitter is directed to transmit a pulse of light over a communications link, such as a fiber optic cable, and a timer is started with reference to the transmission. An output tap of the transmitter is monitored to detect the transmission of the pulse of light and any reflection events which occur due to the transmission. A final reflection event is identified, along with a timing associated with the final reflection event using the timer. A length of the communications link is estimated based on the timing. An updated output power for the transmitter is calculated based on the estimated length of the communications link. The output power for the transmitter can be reduced when the length of the link is less than that expected, while maintaining a minimum power margin at a receiver.

20 Claims, 4 Drawing Sheets

AUTOMATIC OPTICAL REFLECTOMETER POWER ADJUSTMENT

BACKGROUND

An optical communications link can be embodied as a single end-to-end optical circuit. An optical fiber is one example of an optical link. In most cases, optical fibers are flexible, transparent fibers made by drawing glass or plastic to a suitably small diameter. Optical fibers can be used as a means to transmit light in fiber-optic communications and to permit data transmission over relatively longer distances and at relatively higher bandwidths than wire cables. Optical fibers are also preferable in some cases because signals travel along them with less loss and without electromagnetic interference.

An optical time-domain reflectometer (OTDR) is an optoelectronic instrument that can be used to evaluate an optical link or fiber. An OTDR is similar in function to a time domain reflectometer for copper wires, but used to characterize optical links. An OTDR transmits one or more optical pulses into an optical link and analyzes any light that is reflected or scattered back. The scattered or reflected light can be used to evaluate the optical link. This is similar to the way that a time domain reflectometer measures reflections caused by changes in the impedance of wires under test.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

As demands for data transfer increase, the need for additional data transceivers also increases. With the addition of transceivers, particularly in data centers where the density of data transceivers and related equipment is relatively dense, the power consumed by data transceivers can become significant.

For optical communications systems, one of the main contributors to power consumption in transmitters is the amount of power needed to bias and modulate the output of lasers. If a transmitter uses a constant wave (CW) laser and a separate modulator, for example, then separate bias currents or voltages are needed for the laser and modulator. The laser bias voltages can be set at or above levels needed to transmit light at a minimum optical output power level (e.g., in dBm), and the modulator bias voltages and drive voltages can be set at or above levels needed to meet minimum extinction ratios, both of which may be specified by an industry standard or an industry Multisource Agreement (MSA). These minimum optical output power levels and extinction ratios are needed to ensure that the receivers receive sufficient optical power levels (e.g., in dBm) to work properly.

Any given transmitter can be designed and rated for a minimum link distance, such as 100 meters, 2 km, or 10 km, and must operate at a minimum transmit power level to ensure an optical link budget sufficient enough for communication to a receiver over the minimum link distance. In reality, relatively few transmitter and receiver pairs are installed between ports in a communications system at the rated full link distance. In some cases, the transmitter and receiver pairs can be merely a few meters apart, while the rated full link distance is a kilometer or more.

Looking over a wider distribution of the distances between ports in a data center, for example, it is often the case that a significant number of transmitter and receiver pairs are installed between ports having link distances which are significantly shorter than the rated link distance. Yet, each transmitter is transmitting data using enough optical power to operate at the full rated distance of the link.

The optical power level of a transmitter at a first port could be adjusted based on feedback from a connected receiver at a second port if that receiver monitors its received data stream for bit errors. As one example, the transmitter at the first port could lower its output power in small increments until the connected receiver at the second port begins to see bit errors. The receiver could then signal the transmitter through an auxiliary or control data stream to instruct the transmitter to increase and/or maintain its output power for transmission. However, this type of adaptive output power through feedback may not be defined by any standard or MSA, so the functionality would not work in a system where multi-vendor interoperability is required or where transmitters and receivers are manufactured by different vendors.

In the context outlined above, an optical transmitter that can automatically or independently estimate a link length and adjust (e.g., lower) its output power while maintaining relatively error free data transmission could be relied upon to save power. In one embodiment described below, an optical transmitter is directed to transmit a pulse of light over a communications link, such as a fiber optic cable, and a timer is started with reference to the transmission. An output tap of the transmitter is monitored to detect the transmission of the pulse of light and any reflection events which occur due to the transmission. A final reflection event is identified, along with a timing associated with the final reflection event using the timer. A length of the communications link is estimated based on the timing. An updated output power for the transmitter is calculated based on the estimated length of the communications link. The output power for the transmitter can be reduced when the length of the link is less than that expected, while maintaining a minimum power margin at a receiver.

Figure 1:
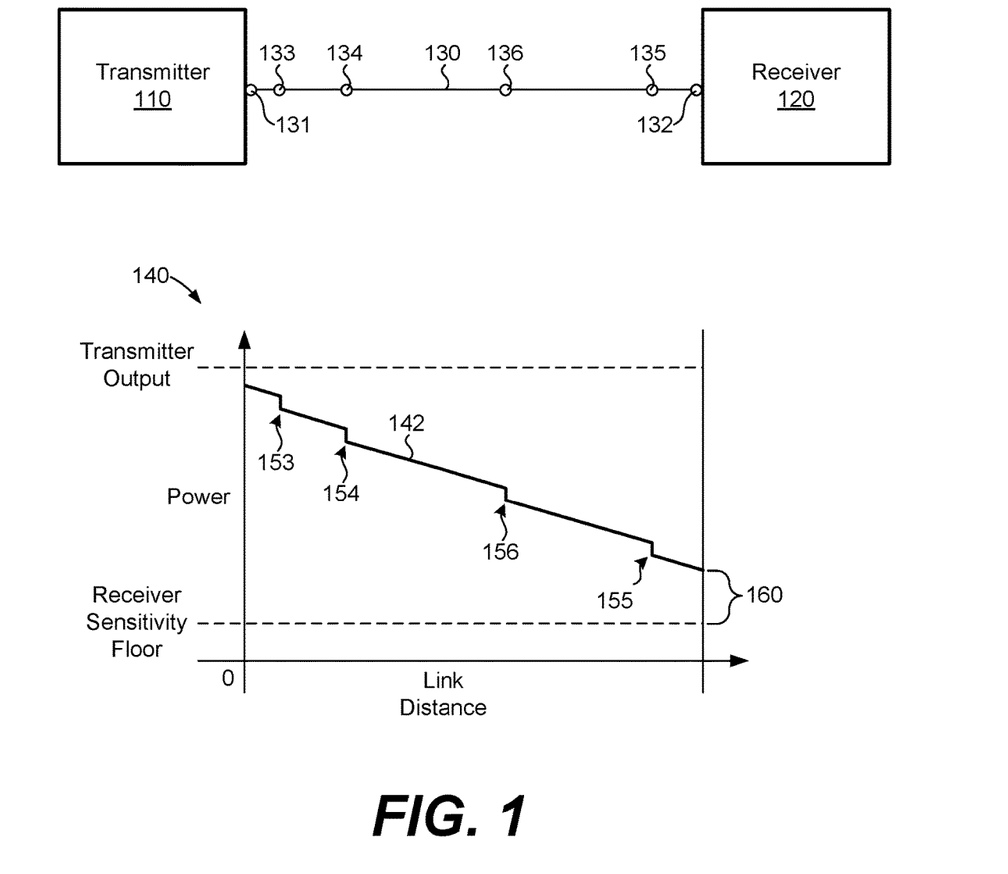
FIG. 1 illustrates an example data communications system and link budget for the communications system according various embodiments described herein.

Turning to the drawings, FIG. 1 illustrates an example data communications system 100 and link budget 140 for the communications system 100 according to various embodiments described herein. The data communications system 100 is representative and provided as context for a description of various aspects of the embodiments. The embodiments are not limited to use with any particular type of communications system, transmitters, receivers, or data communications links.

As shown in the example of FIG. 1, the data communications system 100 includes a transmitter 110, a receiver 120, and a data communications link 130 for data communications between the transmitter 110 and the receiver 120. In one example, the transmitter 110 can be embodied as an optical transmitter, such as a light emitting diode transmitter, a laser diode transmitter, or photonic integrated circuit (PIC) laser transmitter, among other types of optical transmitters.

In one example case, the transmitter 110 can include one or more Distributed Feedback (DFB) laser diodes coupled to one or more optical modulators, an optical multiplexer, monitoring photodetectors, and an output coupler to the data communications link 130, among other components. The optical modulators in the transmitter 110 can be configured to modulate the light output by the laser diodes, and the modulated light can be optically coupled to the data communications link 130 for optical transmission to the receiver 120. Thus, the laser diodes in the transmitter 110 can be CW DFB Lasers coupled to optical modulators. In other cases, the concepts described herein can be applied to transmitters with Electro-absorption Modulated Lasers (EMLs), or transmitters with Directly Modulated Lasers (DMLs) in which case the optical modulators in the transmitter 110 can be omitted.

The receiver 120 can be embodied as any suitable optical receiver including one or more photodetectors, or other optical-electrical converter to receive and detect modulated light transmitted by the transmitter 110 over the data communications link 130. The receiver 120 converts the modulated light from the data communications link 130 into one or more electrical (e.g., digital) signals for processing by receive circuitry in the receiver 120. The receive circuitry can include a combination of analog and digital circuitry, such as transimpedance and/or limiting amplifiers, clock recovery circuitry, phase-locked loop circuitry, data recovery circuitry, etc. The receive circuitry in the receiver 120 can be configured to produce an electric, analog representation of the modulated light received over the data communications link 130, convert the analog representation to a digital signal, and recover clock and data signals from the digital signal.

The data communications link 130 can be embodied as one or more optical fibers capable of carrying light, such as the modulated light generated by the transmitter 110, between the transmitter 110 and the receiver 120. For example, the data communications link 130 can be embodied as one or more single- or multi-mode optical fibers of any length in various embodiments. As shown in FIG. 1, the data communications link 130 is coupled to the transmitter 110 at the transmitter connector coupling 131 and to the receiver 120 at the receiver connector coupling 132.

A number of additional connectors 133-135 and a splice 136 can be found along the data communications link 130. Particularly, because the data communications link 130 can be formed from a number of lengths of optical fiber in some cases, the connectors 133-135 are representative of points along the data communications link 130 where lengths of optical fiber are coupled together, possibly by using optical fiber connectors. Further, the splice 136 is representative of a location where two lengths of optical fiber are coupled together without connectors.

The link budget 140 provides a representative example of the power 142 of the modulated light transmitted from the transmitter 110 as it travels along the data communications link 130. As shown in FIG. 1, the power 142 decays linearly in proportion to the length of the data communications link 130, with a number of power drops 153-155 corresponding, respectively, to the connectors 133-135, and a power drop 156 corresponding to the splice 136.

In the example shown in FIG. 1, a power margin 160 exists between the power 142 of the modulated light from the transmitter 110 as it reaches the receiver 120 and the sensitivity floor of the receiver 120. The receiver 120 cannot reliably recover (e.g., demodulate with sufficient signal to noise ratio) data from the modulated light if the power 142 of the modulated light falls below the sensitivity floor of the receiver 120 when it is received. The existence of the power margin 160 in the link budget 140 means that the receiver 120 should be capable of reliably recovering the data in the modulated light from the transmitter 110.

It is not necessary for reliable communications, however, for the power margin 160 in the data communications system 100 to be particularly large (e.g., in dBm or related metric). Instead, larger power margins may indicate inefficient use of power, because the transmitter 110 is transmitting modulated light using more than the amount of power necessary.

Figure 2:
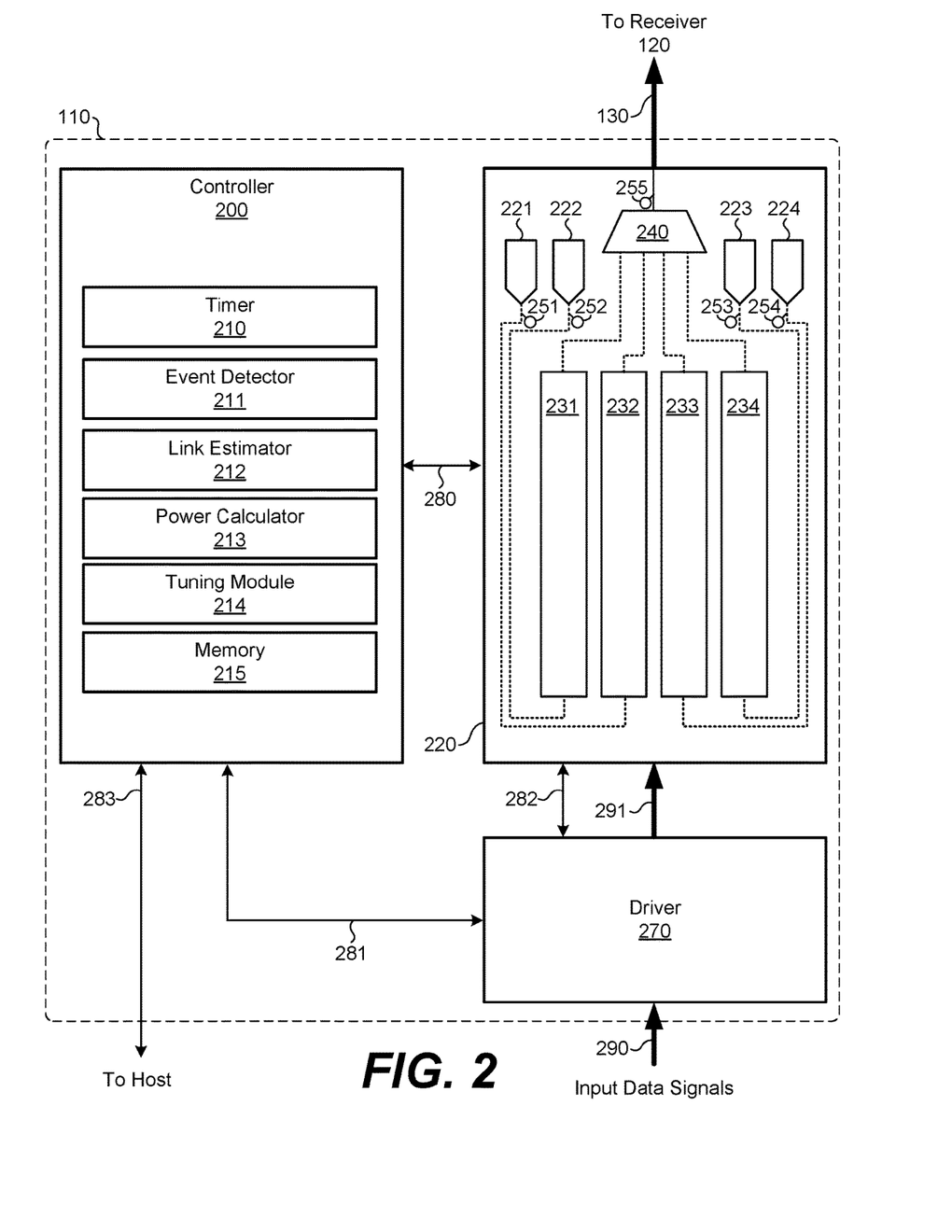
FIG. 2 illustrates an example transmitter for the data communications system shown in FIG. 1 according to various embodiments described herein.

FIG. 2 illustrates additional components of the transmitter 110 shown in FIG. 1 according to various embodiments described herein. Among other supporting circuitry or components, the transmitter 110 includes a controller 200, an optical transmitter 220, and a driver 270. The elements of the transmitter 110 shown in FIG. 2 are provided as a representative example. The transmitter 110 can include other elements or omit one or more of the elements shown in FIG. 2. Further, one or more of the controller 200, optical transmitter 220, and driver 270 can be integrated together on a single semiconductor chip, or divided among additional chips in a larger chipset for data communications.

The controller 200 and driver 270 can be designed as integrated circuit chips for supporting, controlling, and driving the optical transmitter 220. The controller 200, optical transmitter 220, and driver 270 can interface with each other over one or more proprietary and/or standard local interfaces 280-282, including serial interfaces, parallel interfaces, and combinations thereof. In that context, the interfaces can include any suitable combination of digital and/or analog control, driver, feedback, etc. interfaces. In some cases, the controller 200, optical transmitter 220, and driver 270 can be packaged together in a standard form factor package, such as a complete Transmitter Optical Subassembly (TOSA), Quad Small Form-Factor Pluggable (QSFP) form factor package, or other suitable package or form factor, possibly specified through an MSA. The controller 200, optical transmitter 220, and driver 270 may also be mounted directly on a system circuit board in a method known as chip-on-board.

The controller 200 can be embodied as a general purpose processing or application specific integrated circuit (ASIC) control chip or device for controlling the operations of the optical transmitter 220. In that context, the controller 200 can be designed to control the optical transmitter 220 according to one or more optical communications standards.

Generally, the controller 200 is configured to control the operations of and tune and monitor the configuration and status of the optical transmitter 220. For example, through the local interface 280 with the optical transmitter 220 and/or the local interface 281 with the driver 270, the controller 200 is configured to control and monitor the temperature, output power, and other operating characteristics and parameters of the optical transmitter 220. To that end, as shown in FIG. 1, the controller 200 includes a timer 210, an event detector 211, a link estimator 212, a power calculator 213, a tuning module 214, and a memory 215, among other elements. The operations and functions of the controller 200 are described in further detail below.

The optical transmitter 220 can be embodied as an integrated optical transmitter chip or device. In one example case, the optical transmitter 220 is designed to generate four single longitudinal mode Continuous Wave (CW) laser tones, impress high speed digital modulation upon the tones, and wavelength-multiplex the modulated tones onto a common output port for coupling into the data communications link 130 and transmission to the receiver 120. The controller 200 is coupled to the optical transmitter 220 through the local interface 280 as described herein to control the power output, modulation, and other functions of the optical transmitter 220.

As shown in FIG. 2, the optical transmitter 220 includes four emitting diodes 221-224, optical modulators 231-234, a multiplexer 240, and photodetectors 251-254, among other elements. In one example, the emitting diodes 221-224 can be embodied as Distributed Feedback (DFB) laser diodes operating in the O-band range of wavelengths from 1260-1360 nm. In other cases, the emitting diodes 221-224 can be embodied as other types of light emitting or laser diodes (e.g., VCSELs, etc.) formed through any suitable manufacturing technique and operating in other wavelength ranges, such as the C or L bands, for example. The operation and output power of the optical transmitter 220 can be controlled by the controller 200 and/or the driver 270 according to aspects of the embodiments.

The optical transmitter 220 includes the optical modulators 231-234, which can be embodied as any suitable type of optical modulator capable of high speed digital modulation (e.g., Non-Return-To-Zero (NRZ)). The modulators can be designed with adjustable extinction ratios and high eye mask margins. The outputs of the emitting diodes 221-224 are coupled, respectively, to the optical modulators 231-234 using optical waveguides in the optical transmitter 220. The optical modulators 231-234 are designed and configured to modulate the light output from the emitting diodes 221-224 at the direction of the driver 270 and under the control of the controller 200, as described in further detail below. Thus, the optical transmitter 220 incorporates CW DFB Lasers, because the emitting diodes 221-224 are not directly modulated. In other cases, such as if the emitting diodes 221-224 were not operated in CW mode, the concepts described herein can be applied to EMLs or DMLs, and the emitting diodes 221-224 could be modulated using a modulating voltage provided by the driver 270. In these cases, the optical modulators 231-234 could be omitted.

The optical transmitter 220 also includes the multiplexer 240. The multiplexer 240 can operate as a Wavelength Division Multiplexer (WDM), such as a 4:1 Coarse Wavelength Division Multiplexer (CWDM), and provide coupling of a wavelength-multiplexed optical output signal onto a common output port of the optical transmitter 220 for transmission to the receiver 120.

The photodetectors 251-254 can be embodied as sensors capable of measuring the output power of light emitted from the emitting diodes 221-224, respectively. In that context, each of the photodetectors 251-254 can output an electrical signal representative of the output power of light emitted from the emitting diodes 221-224, and those signals can be provided as a reference to the controller 200 for closed loop control of the optical transmitter 220. Additionally, the photodetectors 251-254 can be relied upon for system initialization and closed loop control.

The photodetector 255 is similar to the photodetectors 251-254, but measures the output power of the wavelength-multiplexed optical output signal from the multiplexer 240. The photodetector 255 can be used to confirm the alignment of the output optics of the optical transmitter 220 and the data communications link 130. In addition to measuring the power of the output signal transmitted from the multiplexer 240, the photodetector 255 can also measure the power of light reflected back to the optical transmitter 220 over the data communications link 130. Because the photodetector 255 can be used to measure the power of light reflected back, the transmitter 110 can incorporate certain functions similar to those performed by an optical time-domain reflectometer (OTDR) as described herein.

The driver 270 can be embodied as an integrated circuit device for high speed input data recovery, reconstruction and conditioning, clock recovery and data retiming, and driving bias and modulation output (e.g., current and/or voltage). For control, the driver 270 can include a number of internal registers accessible to other devices, such as the controller 200, through the local interface 281. The values of the internal registers can be programmatically read from and/or written to, to evaluate and adjust the operating status and parameters of the driver 270.

One or more channels of input data signals 290 can be provided to the driver 270. To recover and reconstruct the underlying data on the input data signals 290, the driver 270 can include adaptive or programmable input buffers, filters, equalizers, etc. The driver 270 can also include an adaptive or programmable clock and data recovery (CDR) circuit. The CDR is configured to extract a high-speed clock from the input data signals 290 and retime the data with the extracted clock. In that way, the CDR can remove jitter from the input data signals 290 and improve the jitter budget for data communications. As one example, the CDR circuits can programmatically retime each channel of the input data signals 290 to a certain bitrate, such as 25.78 Gbps, 27.95 Gbps, or 28.05 Gbps, for example. The CDR can also provide a monitor clock output and other signals and information to the controller 200 through the local interface 281.

The driver 270 also includes driver circuitry configured to provide bias and/or modulation power 291 to the optical modulators 231-234. Particularly, based on the data received over the input data signals 290, the driver circuitry in the driver 270 can provide bias and/or modulation power (e.g., bias and/or modulation voltages) to the optical modulators 231-234 in the optical transmitter 220. The driver circuitry can be programmed to provide a range of bias and/or modulation voltages, in certain increments. In addition, the controller 200 can be programmed to provide a range of bias power to the emitting diodes 221-224 based on the types and operating characteristics of the emitting diodes 221-224 and the operating conditions.

In one configuration, the driver 270 and the controller 200 can be programmed to provide bias and/or modulation power to the optical transmitter 220 over a relatively narrow range of currents and/or voltages to meet certain requirements defined in an MSA. For example, the MSA might define data communications over a certain length of the data communications link 130, such as 100 m, 2 km, or 10 km. To achieve data communications with a suitable power margin at the side of the receiver 120 in that case, the driver 270 and the controller 200 can be programmed to provide the power over ranges of currents and/or voltages to meet the power margin.

Figure 3:
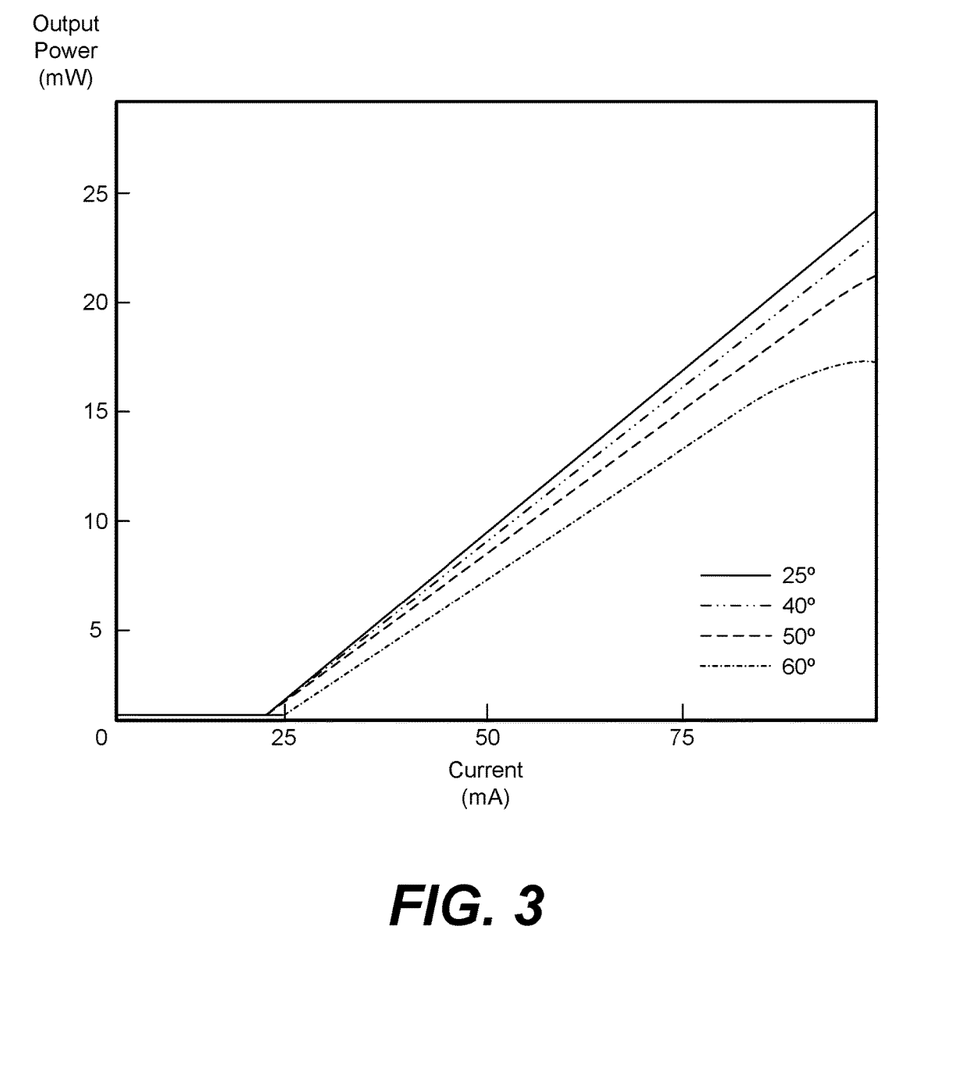
FIG. 3 illustrates example light output power verses input current curves for an example light emitting diode according to various embodiments described herein.

FIG. 3 illustrates example light output power verses input current (L/I) curves for an example laser diode at various operating temperatures. The L/I curves shown in FIG. 3 are provided as a representative example for one of the emitting diodes 221-224 at various operating temperatures, but it should be appreciated that other types of emitting diodes can exhibit other L/I curves (e.g., with other slopes, higher efficiencies, lower efficiencies, etc.).

Referring to FIG. 3 as an example, the control circuitry in the controller 200 can be programmed to provide bias power over a range of current (e.g., 25-75 mA, etc.) to provide sufficient output power from the emitting diodes 221-224 to meet a power margin for data communications at a certain minimum length of the data communications link 130 according to an MSA. However, the actual length of the data communications link 130 between the transmitter 110 and the receiver 120, for example, might be significantly less than that defined in the MSA, particularly in data centers where communications ports can be located merely meters apart. Thus, if the length of the data communications link 130 were less than that defined in the MSA, the controller 200 could be programmed to provide less bias power to the emitting diodes 221-224 while still providing sufficient output power from the optical transmitter 220 for data communications at the shorter link length. Such a reduction in power, when accounted for over several optical communications links, can result in significant power savings and costs.

According to aspects of the embodiments, the controller 200 of the transmitter 110 is configured to estimate a length of the data communications link 130 and adjust (e.g., reduce) the output power of one or more of the emitting diodes 221-224. The output power can be adjusted while maintaining relatively error free data transmission with the receiver 120. To that end, the controller 200 includes a combination of ASIC logic, circuitry, program code (e.g., machine-readable instructions), registers, memories, etc., to provide functionality similar to that provided by an OTDR. According to the examples described herein, the controller 200 includes the timer 210, event detector 211, link estimator 212, power calculator 213, tuning module 214, and memory 215, among other elements, to estimate the length of the data communications link 130 and adjust the output power of the emitting diodes 221-224.

Figure 4:
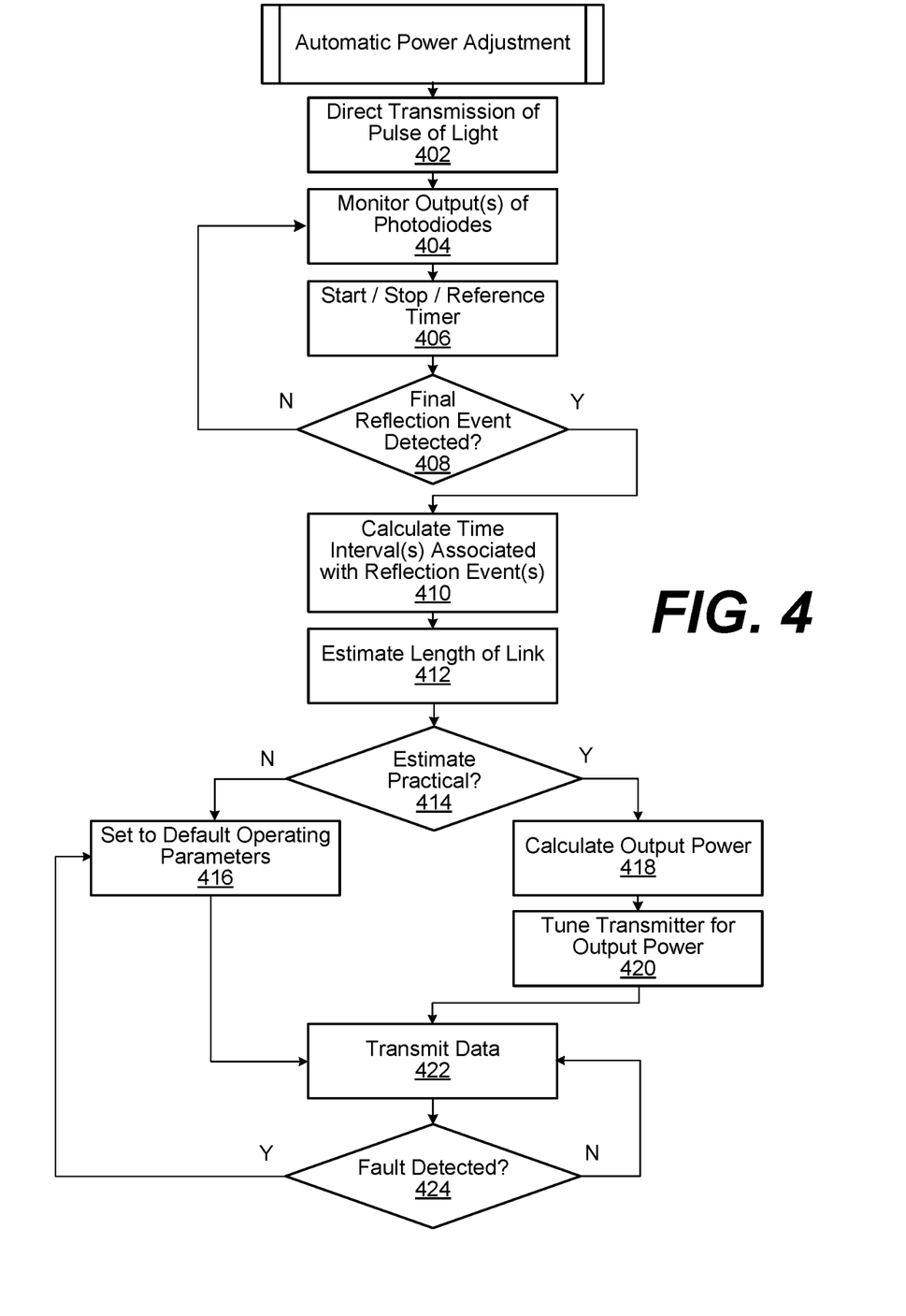
FIG. 4 illustrates a process of automatic optical reflectometer power adjustment performed in the data communications system shown in FIG. 1 according to various embodiments described herein.

Here, an introduction to the automatic power adjustment features of the controller 200 is provided before turning to a more detailed description with reference to FIG. 4. The automatic power adjustment features can be activated through an internal configuration parameter, register, or flag stored in the memory 215, for example. In that way, a host device in which the transmitter 110 is installed can configure the controller 200 through a local interface 283, for example, to enable the automatic power adjustment features.

When the automatic power adjustment features are enabled, the controller 200 is configured to perform an automatic link length evaluation and output power adjustment procedure upon powering up or initializing the transmitter 110 or at any other suitable time. At first, the controller 200 is configured to direct the optical transmitter 220 and/or the driver 270 to reduce (eliminate, or nearly eliminate) the output power of any light being transmitted over the data communications link 130 and maintain that reduced output for a sufficient period of time. To that end, the controller 200 can reduce the bias power provided to the emitting diodes 221-224 and/or direct the driver 270 to reduce the bias power provided to the optical modulators 231-234. The controller 200 can also direct the driver 270 to transmit a certain type of data, a certain pattern of data, etc. The controller 200 can also monitor an output of the photodetector 255 of the optical transmitter 220 to ensure that the light output power being transmitted has been sufficiently reduced for enough time to test the data communications link 130.

Once the data communications link has been prepared for testing, the controller 200 is configured to direct the optical transmitter 220 and/or the driver 270 to transmit a pulse of light over the data communications link 130. The pulse of light can be of any suitable output power level, length, etc. for measurement of reflections over the data communications link 130. The pulse of light can be transmitted using any combination of one or more of the emitting diodes 221-224, modulated or unmodulated by the optical modulators 231-234 according to a certain type or pattern of data, and combined in any suitable way by the multiplexer 240.

In turn, the event detector 211 is configured to monitor an output of the photodetector 255 of the optical transmitter 220 to detect the transmission of the pulse of light over the data communications link 130. The event detector 211 is configured to start and/or reference the timer 210 in response to the transmission of the pulse of light over the data communications link 130. An initial transmission timing associated with the transmission of the pulse of light can be stored in the memory 215 for later reference. The initial transmission timing can be an absolute or relative timing and defined according to any suitable metric (e.g., seconds, cycles, etc.) counted by the timer 210.

In addition to the initial transmission of the pulse of light, the event detector 211 is also configured to monitor the photodetector 255 to detect reflections from the pulse received back over the data communications link 130. The reflections can be attributed, for example, to reflections off of the connectors 133-135 and the splice 136 as described above with reference to FIG. 1. The event detector 211 is configured to reference the timer 210 in response to the detection of any reflections of light received back over the data communications link 130. A reference timing associated with each of the reflections can be stored in the memory 215 for later reference. Additionally, the event detector 211 can store data related to the magnitude or strength of each of the reflections. The magnitudes of the reflections can be relied upon to estimate power losses along the data communications link 130 as described below.

The event detector 211 is also configured to monitor for and identify a final reflection event based on the output of the photodetector 255. The final reflection event can be attributed to a reflection of the pulse of light off of the receiver connector coupling 132 at the receiver 120. Again, the event detector 211 is configured to reference the timer 210 in response to the detection of the final reflection event. A final timing associated with the final reflection can be stored in the memory 215 for later reference. The final reflection event can be distinguished by event detector 211 from other, earlier reflection events, for example, when no further reflection events are detected for a predetermined period of time. The predetermined period of time can be calculated beforehand based on the expected maximum length of the data communications link 130.

After the final reflection event is identified by the event detector 211, the link estimator 212 is configured to calculate an interval of time between when the pulse of light was transmitted and when the final reflection event was detected. For example, the link estimator 212 can calculate an interval of time between the initial transmission timing associated with the initial transmission of the pulse of light and the final timing associated with the final reflection event, as those timings are stored in the memory 215.

The link estimator 212 is also configured to estimate a length of the data communications link 130 based on the interval of time between the initial transmission timing and the final timing and an average refractive index value of the data communications link 130. In fiber optics, fiber latency is related to the time it takes for light to travel a specified distance through the optical core of the fiber. Light moving through the optical core travels slower than light through a vacuum because of the differences of the refractive index of light in free space and in the optical core. The memory 215 can store a table of the refractive indexes of various types of single- and multi-mode optical fibers. The memory 215 can also store one or more average refractive indexes of various types of such optical fibers. Using one or more of the refractive index values stored in the table, the link estimator 212 can calculate the speed at which light generated by the emitting diodes 221-224 will travel over the data communications link 130.

Since the refractive index of light in the optical core of a fiber is also dependent on the wavelength of the light being transmitted through it, the link estimator 212 can account for the particular wavelength of light generated by one or more of the emitting diodes 221-224, which are separated from each other, for additional precision in calculations. Alternatively, the link estimator 212 can perform calculations based on an average wavelength of light generated by one or more of the emitting diodes 221-224. As one example, using 100 km length of G.652 fiber optic cable with a 1310 nm laser would result in a latency of about 489.34 µs. At 1550 nm, the same length of cable would result in a latency of about 489.67 µs. Such small differences can be accounted for by the link estimator 212 in some cases, but average wavelengths and refractive indexes can be suitable for many applications.

Thus, based on the interval of time between the initial transmission of the pulse of light and the final reflection event (i.e., the time latency in receipt of the final transmission) and the refractive index (or average refractive index) of the data communications link 130, the link estimator 212 can estimate the length of the data communications link 130 in the form of any suitable metric (e.g., meters, yards, etc.). Because the output power of light transmitted over the data communications link 130 decays in proportion to the length of the data communications link 130, the output power of the optical transmitter 220 can be adjusted if the link estimator 212 determines that the length of the data communications link 130 is less than that for which the transmitter 110 was designed for under an MSA, for example.

The power calculator 213 is configured to calculate an output power for the optical transmitter 220 based on the length of the data communications link 130 estimated by the link estimator 212. For example, if the length of the data communications link 130 is about half of that expected, the power calculator 213 can determine that the output power for the optical transmitter 220 can be reduced by about 40% or more than that expected (e.g., expected based on an MSA), while maintaining a minimum power margin at the receiver 120. The power calculator 213 can reference data related to output powers, power margins, and link budgets stored in the memory 215 for an expected, nominal length of the data communications link 130. The power calculator 213 can also compare that information against the estimated length of the data communications link 130 to arrive at a reduction in output power for the optical transmitter 220.

In some cases, the power calculator 213 can also account for certain power losses that might be expected along the data communications link 130 (e.g., in addition to any linear or length-proportionate losses) based on reflection events between the initial transmission of the pulse of light and the final reflection event. As described above, the intervening reflection events can be attributed to reflections of light off of the connectors 133-135 and the splice 136. As shown in FIG. 1, the connectors 133-135 and the splice 136 can result in the power drops 153-156 in the link budget. Thus, based on the number and, in some cases, magnitude or strength of the reflections, the power calculator 213 can account for some additional power that might be needed in the link budget to overcome losses due to one or more connectors and/or splices along the data communications link 130. In that case, the overall reduction in power might be less than that which might be possible if the data communications link 130 did not include any connectors or splices.

Once the reduction in output power is determined by the power calculator 213, the tuning module 214 is configured to update the operating parameters of controller 200, the optical transmitter 220, and/or the driver 270 to reduce the output power of the optical transmitter 220. In some cases, the output power of the optical transmitter 220 can be reduced to an amount no greater than that needed to maintain a minimum power margin at the receiver 120 based on the length of the data communications link 130. In other cases, the output power can be reduced to maintain, at least, no less than a predetermined power margin at the receiver 120.

The reduction in output power can be achieved in various ways. For example, the bias power provided to the emitting diodes 221-224 and/or the optical modulators 231-234 can be reduced. Additionally or alternatively, the modulating power provided to the emitting diodes 221-224 and/or the optical modulators 231-234 can be reduced. The amount and manner of power reduction can depend on several factors, including the calculations performed by the power calculator 213, whether the optical transmitter 220 incorporates DML or EML lasers, requirements defined in an MSA (e.g., extinction ratios, etc.), and other factors.

In any case, the tuning module 214 can interface with the optical transmitter 220 and/or the driver 270 to tune them for data communications at the reduced output power level. In that context, the tuning can include adjusting bias voltages of one or more heater control elements for the optical modulators 231-234, adjusting the bias voltages for the emitting diodes 221-224 and/or the optical modulators 231-234, adjusting the drive voltages to the optical modulators 231-234, monitoring the outputs of the photodetectors 251-255, and checking and/or adjusting other operating characteristics.

FIG. 4 illustrates a process of automatic optical reflectometer power adjustment performed in the data communications system shown in FIG. 1 according to various embodiments described herein. The process diagram shown in FIG. 4 provides one example of a sequence of steps that can be used for automatic optical reflectometer power adjustment as described herein. The arrangement of the steps shown in FIG. 4 is provided by way of representative example. In other embodiments, the order of the steps can differ from that depicted. For example, an order of execution of two or more of the steps can be scrambled relative to the order shown. Also, in some cases, two or more of the steps can be performed concurrently or with partial concurrence. Further, in some cases, one or more of the steps can be skipped or omitted. Additionally, although the process is described in connection with the transmitter 110 shown in FIGS. 1 and 2, other optical transmitters can perform the process.

At reference numeral 402, the process includes the controller 200 directing the optical transmitter 220 and/or the driver 270 to transmit a pulse of light over the data communications link 130. The pulse of light can be of any suitable output power level, length, etc., and can be transmitted using any combination of one or more of the emitting diodes 221-224, modulated or unmodulated by the optical modulators 231-234, and combined in any suitable way by the multiplexer 240. In some cases, before the pulse of light is transmitted, the process can also include the controller 200 directing the optical transmitter 220 and/or the driver 270 to reduce (eliminate, or nearly eliminate) the output power of any light being transmitted over the data communications link 130 to prepare it for testing as described above.

At step 404, the process includes the event detector 211 monitoring an output of the photodetector 255 of the optical transmitter 220 to detect the transmission of the pulse of light over the data communications link 130. The monitoring at step 404 is not limited to the detection of the initial transmission of the pulse of light, however. Instead, the monitoring can continue in an ongoing fashion over time until a final reflection event due to a reflection of the pulse of light off the receiver connector coupling 132 is detected at step 408. During the ongoing monitoring, the event detector 211 can also detect a number of reflection events due to reflections of the pulse of light off of the connectors 133-135 and the splice 136, for example.

At step 406, the process includes the event detector starting, stopping, and/or referencing the timer 210 in response to the detection of the transmission of the pulse of light, detection of the final reflection event, and/or the detection of any intervening reflection events between the transmission of the pulse of light and the final reflection event. An initial transmission timing associated with the transmission of the pulse of light can be stored in the memory 215. Additionally, timings can be stored in the memory for the final reflection event and any intervening reflection events. The timings can be an absolute or relative timing and defined according to any suitable metric (e.g., seconds, cycles, etc.) counted by the timer 210.

At step 408, the process includes the event detector 211 determining whether the final reflection event has been detected. As described above, the event detector 211 can distinguish the final reflection event from other, earlier reflection events, when no further reflection events are detected for a predetermined period of time. The predetermined period of time can be calculated beforehand based on the expected maximum length of the data communications link 130. If the final reflection event has not been detected, then the process proceeds back to step 404 for ongoing monitoring. Otherwise, if the final reflection even has been detected, then the process proceeds to step 410.

At step 410, the process includes the link estimator 212 calculating an interval of time between when the pulse of light was transmitted and when the final reflection event was detected. For example, the link estimator 212 can calculate an interval of time between the initial transmission timing associated with the initial transmission of the pulse of light and the final timing associated with the final reflection event, as those timings are stored in the memory 215.

At step 412, the process includes the link estimator 212 estimating a length of the data communications link 130 based on the interval of time calculated at step 410 and an average refractive index value of the data communications link 130. As described above, light moving through the optical core of a fiber optic cable travels slower than through a vacuum because of the differences of the refractive index of light in free space and in the optical core. The memory 215 can store a table of the refractive indexes (or averages thereof) of various types of single- and multi-mode optical fibers. The link estimator 212 can reference the table at step 412 to calculate the speed at which light generated by the optical transmitter 220 is expected to travel over the data communications link 130.

Based on that speed, the link estimator 212 can also estimate a length of the data communications link 130 with reference to the interval of time between the initial transmission timing and the final timing and the average refractive index value of the data communications link 130. Since the refractive index of light in the optical core of a fiber is also dependent on the wavelength of the light being transmitted through it, the link estimator 212 can also account for the particular wavelength of light generated by one or more of the emitting diodes 221-224, for additional precision in calculations. Alternatively, the link estimator 212 can perform calculations based on an average wavelength of light generated by one or more of the emitting diodes 221-224.

At step 414, the process includes determining whether the estimate calculated at step 412 is practical, reasonable, or acceptable for optical data communications by the transmitter 110. If the estimate is not practical, then the process proceeds to step 416. Indeterminate or impractical estimates could occur if the length of the data communications link 130 cannot be determined for any reason (e.g., the final reflection cannot be ascertained, occurs too late, or occurs too soon), if the length is calculated to be outside expected or predetermined ranges of length, or if the length would result in an operating power level of the transmitter 110 that is unacceptable for any reason. On the other hand, if the estimate calculated at step 412 is suitable under the operating conditions of the transmitter 110, then process proceeds to step 418.

At step 416, the process includes the controller 200 setting or resetting itself, the optical transmitter 220, and/or the driver 270 to default operating parameters. In that context, the controller 200 can clear any flag set in the memory 215, for example, to turn off the automatic power adjustment features of the transmitter 110. The controller 200 can also configure itself for default operating conditions, including default bias and/or modulating power levels, based on an MSA or other predetermined protocols or specifications. Generally, the transmitter 110 can operate according to default operating conditions in this case if the estimate calculated at step 412 is impractical for optical data communications for any reason.

If the estimate calculated at step 412 is determined to be practical at step 414, the process proceeds to step 418. At step 418, the process includes the power calculator 213 calculating an output power for one or more of the emitting diodes 221-224 based on the length of the data communications link 130 estimated by the link estimator 212 at step 412. For example, if the length of the data communications link 130 is about half of that expected, the power calculator 213 can determine that the output power for the emitting diodes 221-224 can be reduced by about 40% or more than that expected, while maintaining a minimum power margin at the receiver 120. The power calculator 213 can reference data related to output powers, power margins, and link budgets stored in the memory 215 for an expected, nominal length of the data communications link 130. The power calculator 213 can also compare that information against the estimated length of the data communications link 130 to arrive at a reduction in output power for the emitting diodes 221-224.

In some cases, the power calculator 213 can also account at step 418 for certain power losses that might be expected along the data communications link 130 (e.g., in addition to any linear or length-proportionate losses) based on reflection events between the initial transmission of the pulse of light and the final reflection event. That is, based on the number and, in some cases, magnitude or strength of the reflections, the power calculator 213 can account for some additional power that might be needed in the link budget to overcome losses due to one or more connectors and/or splices along the data communications link 130. In that case, the overall reduction in power might be less than that which might be possible if the data communications link 130 did not include any connectors or splices.

At step 420, the process includes the tuning module 214 updating and/or tuning the operating parameters of the optical transmitter 220 and/or the driver 270 to reduce the output power of the optical transmitter 220 based on the calculation at step 418. In some cases, the output power can be reduced to an amount no greater than that needed to maintain a minimum power margin at the receiver 120 based on the length of the data communications link 130. In other cases, the output power can be reduced to maintain, at least, no less than a predetermined power margin at the receiver 120.

The reduction in output power at step 420 can be achieved in various ways. For example, the bias power provided to the emitting diodes 221-224 and/or the optical modulators 231-234 can be reduced. Additionally or alternatively, the modulating power provided to the emitting diodes 221-224 and/or the optical modulators 231-234 can be reduced. The amount and manner of power reduction can depend on several factors, including the calculations performed by the power calculator 213, whether the optical transmitter 220 incorporates CW, DML or EML lasers, requirements defined in an MSA (e.g., extinction ratios, etc.), and other factors.

In any case, the tuning module 214 can interface with the optical transmitter 220 and/or the driver 270 at step 420 to tune them for data communications at the reduced output power level. The tuning at step 420 can include adjusting bias voltages of one or more heater control elements for the optical modulators 231-234, adjusting the bias voltages for the emitting diodes 221-224 and/or the optical modulators 231-234, adjusting the modulating voltages for the optical modulators 231-234, monitoring the outputs of the photodetectors 251-255, and checking and/or adjusting other operating characteristics.

At step 422, the process includes the transmitter 110 transmitting data. That is, the transmitter 110 can optically transmit data to the receiver 120 over the data communications link 130. For example, while one or more of emitting diodes 221-224 are biased to provide CW laser tone outputs, the driver 270 can provide modulating voltages to the optical modulators 231-234 based on the data from the input data signals 290. The optical modulators 231-234 can then modulate the laser tones and, in turn, the optical transmitter 220 can output modulated light signals representative of that data for communications to the receiver 120. In other cases, the emitting diodes 221-224 can be directly modulated, or other suitable optical modulation techniques can be used.

At step 424, the process includes the controller 200 determining whether a fault has been detected. A fault may result, for example, if the receiver 120 detects a bit error through error coding, the extinction ratio at the receiver 120 deteriorates too much, or if an unexpected condition is detected on one of the photodetectors 251-255. When a fault is detected in connection with the receiver 120, an indication of the fault can be communicated to the controller 200 through the local interface 283, for example, from the host of the transmitter 110. The fault may be identified at the side of the receiver 120 and communicated back to the host as feedback. If a fault is detected at step 424, then the process proceeds back to step 416, where the controller 200 can proceed to set default operating parameters for the transmitter 110 and/or restart or reinitialize the transmitter 110. Otherwise, if no fault is detected at step 424, the process can continue with transmitting data at step 422.

The elements shown in FIG. 2 can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The controller 200 and the driver 270 each include at least one processing circuit. The processing circuit can include one or more processors and one or more storage devices coupled to each other via local, internal interfaces. The storage devices can store data or components that are executable by the one or more processors of the processing circuit.

The timer 210, event detector 211, link estimator 212, power calculator 213, tuning module 214, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, ASICs having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways.

Although embodiments have been described herein in detail, the descriptions are by way of example. The features of the embodiments described herein are representative and, in alternative embodiments, certain features and elements can be added or omitted. Additionally, modifications to aspects of the embodiments described herein can be made by those skilled in the art without departing from the spirit and scope of the present invention defined in the following Therefore, the following is claimed:

1. A method to reduce transmitter power, comprising:
monitoring an output tap of a photonic integrated circuit (PIC) transmitter to detect transmission of a pulse of light over a fiber cable coupled to the PIC transmitter;
referencing a timer based on the transmission of the pulse of light;
monitoring the output tap of the PIC transmitter to detect at least one reflection event in response to the transmission of the pulse of light over the fiber cable, the at least one reflection event comprising a final reflection event;
identifying a timing associated with the final reflection event with reference to the timer; and
tuning an output power of the PIC transmitter based on the timing associated with the final reflection event.

2. The method of claim 1, wherein tuning the output power of the PIC transmitter comprises reducing at least one of a bias voltage or a modulation voltage supplied to at least one of a light emitter or an optical modulator in the PIC transmitter.

3. The method of claim 1, wherein the at least one reflection event further comprises at least one intervening reflection event detected between the transmission of the pulse of light and the final reflection event.

4. The method of claim 3, wherein tuning the output power comprises reducing the output power based on an interval of time between the transmission of the pulse of light and the final reflection event and a magnitude of the at least one intervening reflection event.

5. The method of claim 1, wherein identifying the timing associated with the final reflection event comprises calculating an interval of time between the transmission of the pulse of light and the final reflection event.

6. The method of claim 5, further comprising estimating a length of the fiber cable based on the interval of time and an average refractive index value of the fiber cable.

7. The method of claim 6, wherein tuning the output power of the PIC transmitter comprises calculating the output power based on the length of the fiber cable.

8. The method of claim 6, wherein tuning the output power of the PIC transmitter comprises reducing the output power to maintain a minimum power margin at a receiver based on the length of the fiber cable.

9. A device, comprising:
a photonic transmitter, the photonic transmitter comprising a light emitter and an output port tap;
a driver; and
a controller configured to:
monitor an output tap of the photonic transmitter to detect transmission of a pulse of light from the photonic transmitter;
reference a timer based on the transmission of the pulse of light;
monitor the output tap of the photonic transmitter to detect at least one reflection event in response to the transmission of the pulse of light, the at least one reflection event comprising a final reflection event;
identify a timing associated with the final reflection event with reference to the timer; and
adjust an output power of the photonic transmitter based on an interval of time between the transmission of the pulse of light and the final reflection event.

10. The device of claim 9, wherein the controller is further configured to reduce at least one of a bias voltage or a modulation voltage supplied to at least one of the light emitter or an optical modulator in the photonic transmitter.

11. The device of claim 9, wherein the at least one reflection event further comprises at least one intervening reflection event detected between the transmission of the pulse of light and the final reflection event.

12. The device of claim 11, wherein the controller is further configured to reduce the output power based on the interval of time between the transmission of the pulse of light and the final reflection event and the at least one intervening reflection event.

13. The device of claim 9, wherein the controller is further configured to calculate an interval of time between the transmission of the pulse of light and the final reflection event.

14. The device of claim 13, wherein the controller is further configured to estimate a length of a fiber cable coupled to the photonic transmitter based on the interval of time and an average refractive index value of the fiber cable.

15. The device of claim 14, wherein the controller is further configured to estimate the output power based on the length of the fiber cable.

16. A method to reduce transmitter power, comprising:
monitoring an output tap of a photonic transmitter to detect transmission of a pulse of light from the photonic transmitter;
monitoring the output tap of the photonic transmitter to detect at least one reflection event in response to the transmission of the pulse of light, the at least one reflection event comprising a final reflection event; and
tuning an output power of the photonic transmitter based on an interval of time between the transmission of the pulse of light and the final reflection event.

17. The method of claim 16, wherein tuning the output power of the photonic transmitter comprises reducing at least one of a bias voltage or a modulating voltage supplied to at least one of a light emitter or an optical modulator in the photonic transmitter.

18. The method of claim 16, wherein tuning the output power comprises reducing the output power based on the interval of time between the transmission of the pulse of light and the final reflection event and a magnitude of an intervening reflection event between the transmission of the pulse of light and the final reflection event.

19. The method of claim 16, further comprising estimating a length of a fiber cable coupled to the photonic transmitter based on the interval of time and an average refractive index value of the fiber cable.

20. The method of claim 19, wherein tuning the output power of the photonic transmitter comprises calculating the output power based on the length of the fiber cable.

* * * * *